US005922032A

United States Patent [19]

Modeen et al.

[11] Patent Number: 5,922,032

[45] Date of Patent: Jul. 13, 1999

[54] CONTROLLER AND METHOD OF CONTROLLING A HYDRAULIC CONTROL NETWORK WITH LATCHING VALVE

[75] Inventors: Douglas P. Modeen, Granby; Steven R. Fischer, North Granby, both of Conn.; Peter J. Padykula, Brimfield, Mass.

[73] Assignee: United Technologies Corporation, Windsor Locks, Conn.

[21] Appl. No.: 08/991,326

[22] Filed: Dec. 16, 1997

[51] Int. Cl.[6] .............................. F15B 13/07; G06F 13/18

[52] U.S. Cl. .............................. 701/3; 701/102; 395/734; 364/230.01

[58] Field of Search ................................ 701/3, 101, 102, 701/115; 395/734, 736, 737; 364/230.01, 230.02, 230.03, 941.3, 942.5

[56] References Cited

U.S. PATENT DOCUMENTS 5,048,394 9/1991 McLevige et al. ........................ 91/361
5,054,369 10/1991 Wardle et al. ............................ 91/361
5,081,903 1/1992 Wardle et al. ............................ 91/361
5,551,478 9/1996 Veilleux, Jr. et al. ............. 137/596.15

*Primary Examiner*—Tan Q. Nguyen

[57] ABSTRACT

A control method for managing a hydraulic control system of a vehicle is disclosed. The method includes the steps of scheduling the invocation of a plurality of vehicle functions through system operations, which functions are used for operating the vehicle; prioritizing the invocation of the vehicle functions and associated operations by the system; performing the operations based on prioritization created in the step of prioritizing; and superseding the performance of one of the operations with the performance of a higher priority one of the operations. This occurs if the higher priority operation arises for performance during the performance of the one of the operations. A related controller is also disclosed.

28 Claims, 4 Drawing Sheets

CONTROLLER AND METHOD OF CONTROLLING A HYDRAULIC CONTROL NETWORK WITH LATCHING VALVE

TECHNICAL FIELD

This invention is directed to a controller and method for controlling a hydraulic control system, and more particularly, to a controller and method for controlling a hydraulic control network which uses a selector valve for actuating valves used for adjusting aircraft engine bleed, required for proper acceleration and deceleration, and used for controlling aircraft engine accessory functions and for implementing safety measures.

BACKGROUND ART

The increased complexity of aircraft jet engine hydraulic and pneumatic control systems has resulted in weight and cost increases and reliability decreases. To improve such systems, U.S. Pat. No. 5,551,478, assigned to the assignee of the present invention has issued which is directed to a hydraulic control network which uses a latching valve. As a result of this system, an electro-mechanical-hydraulic mechanism is provided which has resulted in an improvement over the conventional systems.

The increased complexity of current control systems for aircraft engines stems at least partly from an increase in the number of mechanical variables or functions on an aircraft jet engine which must be controlled either hydraulically or pneumatically The mechanical variables, such as the engine bleed, are typically controlled by hydraulic or pneumatic actuators that, in turn, are controlled by fuel or air actuator valves.

The control system of U.S. Pat. No. 5,551,478, is designed to operate under the command of an engine control of the aircraft jet engine which is electronic in nature and issues command signals to a pair of torque motors of the system. The first torque motor of the system acts in conjunction with a three position hydraulic valve. A second torque motor operates in conjunction with a second hydraulic valve to control the linear position of the spool of a multiplexer selector valve. The multiplexer selector valve is a 2×12 valve in that the valve spool is linearly translatable between twelve different positions. In each of the twelve positions, it is possible to generate two high pressure signals to a pair of two position, on/off latching hydraulic fuel and/or air actuator valves. Each actuator valve requires a high pressure signal to turn it on an another high pressure signal to turn it off. Thus, a total of twelve actuator valves are controlled in one embodiment of the control system. The position of the multiplexer selector control valve spool is fed back to the electronic control via a linear variable differential transducer (LVDT).

Currently available electronic controllers are not operable to properly control system of U.S. Pat. No. 5,551,478. That is, current controllers and methods for controlling are not designed to optimize the benefits of the control system disclosed in this patent.

There exists a need, therefore, for an improved controller and method of controlling a hydraulic control system, and more specifically, a hydraulic control system which uses a multiplexing hydraulic control network and latching valves.

DISCLOSURE OF INVENTION

The primary object of this invention is to provide an improved controller and method of controlling a hydraulic jet engine control system.

Another object of this invention is to provide an improved method controller and method for controlling hydraulic jet engine control system which uses a multiplexing hydraulic control network and latching valves.

Still another object of this invention is to provide an improved controller and method of controlling which include means for prioritizing commands provided from an electronic engine control system so that the highest priority commands are executed prior to the execution of lower priority commands.

And still another object of this invention is to provide an improved controller and method of controlling for use with a hydraulic engine control system of a jet engine, which includes the ability to supersede lower priority commands being executed with higher priority commands.

And yet another object of this invention is to provide an improved controller and method of controlling for use with a hydraulic control system of a jet engine which includes a distributed architecture control system including an electronic engine control and an electronic module, wherein the engine control and module are linked via a bi-directional information feedback loop for the dual monitoring of the engine control and module by each other.

And still another object of this invention is to provide an improved controller and method of controlling a hydraulic control system of a jet engine which includes a feedback monitoring system for providing high fault coverage to prevent the occurrence of a hazardous operating condition.

The foregoing objects and following advantages are achieved by the control method and controller of the present invention.

The method includes the steps of scheduling the invocation of a plurality of vehicle functions through system operations, which functions are used for operating the vehicle; prioritizing the invocation of the vehicle functions and associated operations by the system; performing the operations based on prioritization created in the step of prioritizing; and superseding the performance of one of the operations with the performance of a higher priority one of the operations. This occurs if the higher priority operation arises for performance during the performance of the one of the operations. A related controller is disclosed.

BEST MODE FOR CARRYING OUT THE INVENTION

Figure 1:
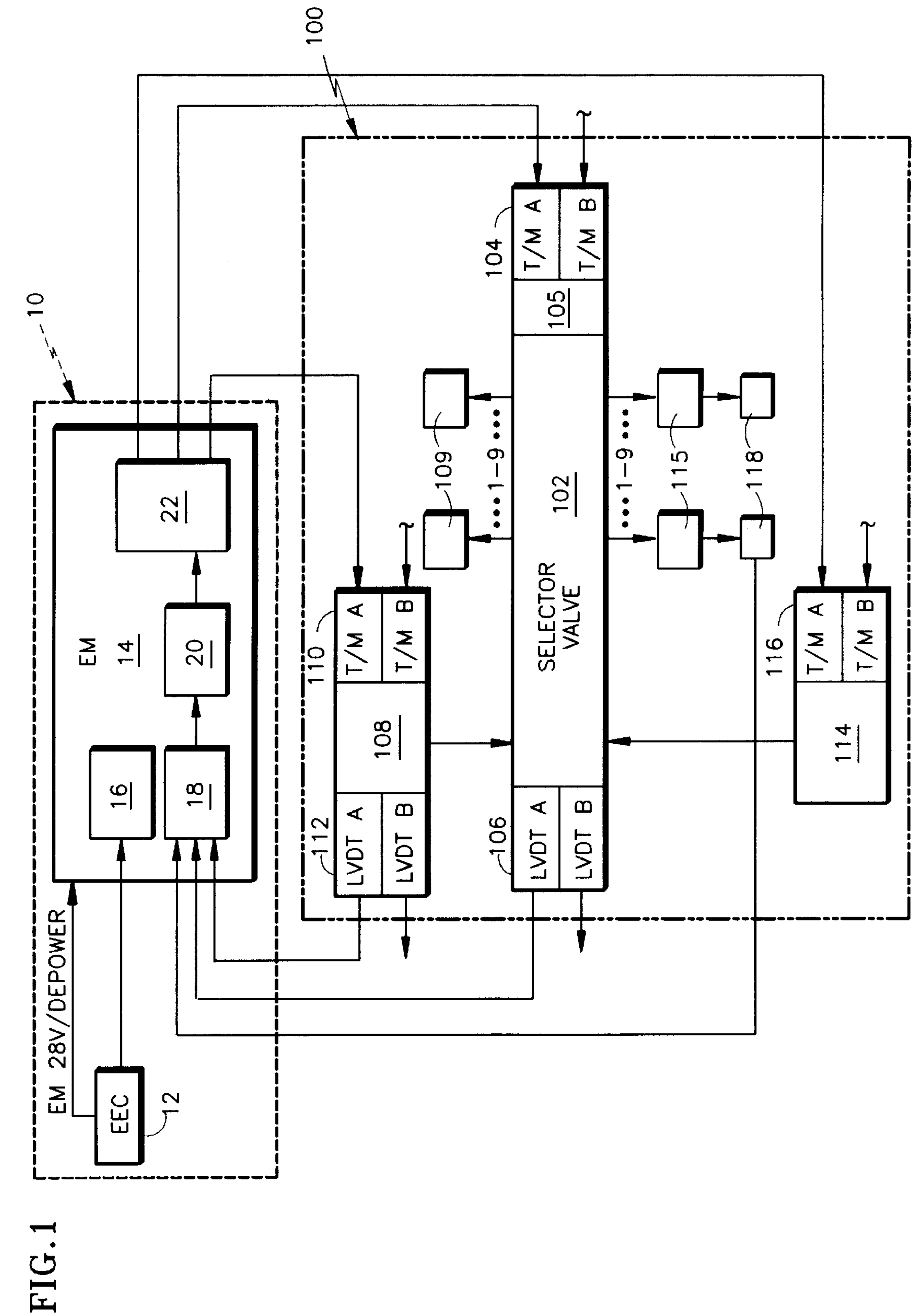
FIG. 1 is a simplified schematic view of the controller of the present invention being used with a hydraulic control system of an aircraft jet engine.

FIG. 1 shows a schematic representation of the controller of the present invention, designated generally as 10. The figure shows controller 10 in combination with a multiplexing hydraulic control network, designated generally as 100, described in the background section. In general, controller 10 includes an electronic engine control (EEC) 12, an electronic module (EM) 14, a buffer 16 for the placement of commands from EEC 12 and for use by EM 14, an input interface 18 for receiving feedback from multiplexing hydraulic control network (HCN) 100, a processor (EMP) 20, and an output interface 22 for sending commands to the HCN 100.

For the purpose of describing the controller 10 of the present invention, multiplexing HCN 100 is more particularly described in U.S. Pat. No. 5,551,478 and is described briefly in the background and assigned to the assignee of the present invention. HCN 100 generally includes a selector valve 102 positioned by a torque motor 104 acting in conjunction with hydraulic valve 105, and a linear variable differential transducer (LVDT) 106 for feeding back the position of selector valve 102 to input interface 18. System 100 further includes nine engine bleed valves 109, for bleeding air between spools of an engine (not shown). It further includes a torque motor 110 for actuating a bleed control valve 108 which opens or closes the engine bleed valves 109 selected via selector 102. Signals from dual LVDT 106 provides selector valve 102 feed back to inprut interface 18 and signals from LVDT 112 fed to input interface 18 provide feed back on bleed valve control valve 108 poistion. Finally, system 100 includes accessory valves 115 for controlling accessories (e.g. engine turbine cooling air, not shown). Torque motor 116 opens and closes accessory control valve 114 which actuates accessory valves 115. As shown in FIG. 1, the dual LVDTs 106, 112 and dual torque motors 104, 110, 116 are provided in a primary and backup channel to account for a malfunction on the primary channel. System 100 also includes accessory status switches 118 for feeding back the on/off status of the accessory valves 115 to input interface 18 of electronic module 14.

Electronic engine control 12 senses engine parameters such as speed and pressure and schedules opening and closing of engine bleed valves 109. Engine operation requires this for achieving acceleration, deceleration, and surge avoidance, etc.. Scheduling occurs through a software algorithm using engine speed and pressure parameters. EEC communicates commands to buffer 16 in EM 14. Processor 20 reads these commands and outputs via interface 22 to torque motor 104 of selector valve 102 and torque motors 110, 116 of bleed and accessory control valves 108, 114. Accordingly, the selector valve 102 is positioned via torque motor 104 and hydraulic valve 105 based on feed back from LVDT 106 provded to, and commands received from EM 14. Corresponding valves for the bleeds or accessories selected by the selector valve are actuated by bleed and accessory control valves 108, 114 positioned by torque motors 110, 116. The position of the selector valve 102 and bleed control valve 108 are constantly fed back by LVDT's 106 and 112, respectively. The feedback arrives at input interface 18 where EEC 12 continually monitors it to determine correct command execution. In addition, the accessory status switches 118 feedback information about accessory status to input interface 18, also for monitoring purposes. If EEC 12 determines incorrect command execution, it takes appropriate safety measures. These include commanding an EM channel switchover to the standby EM (not shown) or removing power from EM 14 in order to maintain the safe operating status of the engine. In addition to the above monitoring, EM 14 monitors EEC 12 via the common interface at buffer 16 to determine if EEC 12 erroneously opened bleeds at high engine power. The foregoing control sequence is discussed in further detail below.

Figure 2:
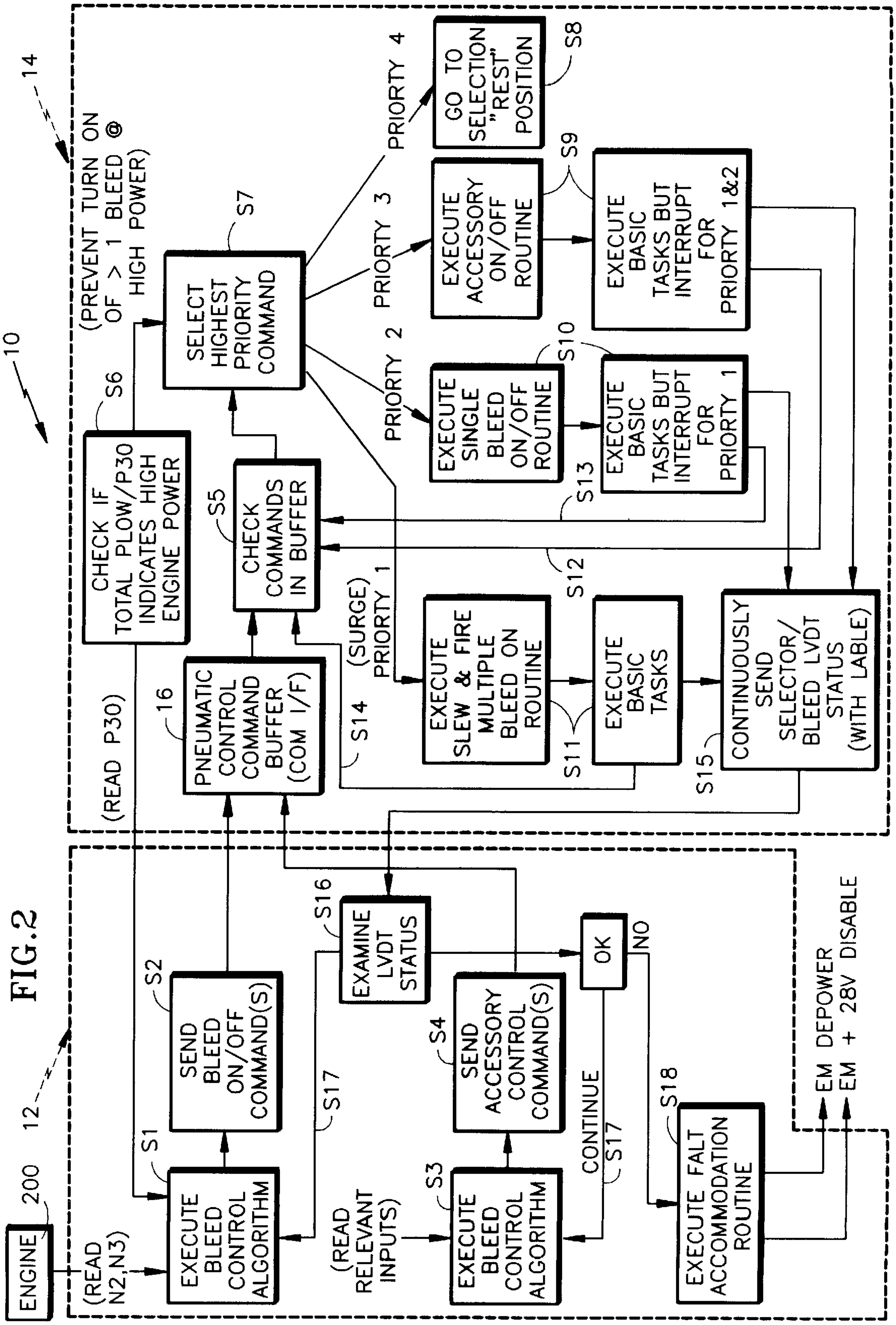
FIG. 2 is a flowchart of the controller and method of control for an aircraft jet engine hydraulic control system.

FIG. 2 shows a flow diagram of the control process steps of controller 10. The diagram includes two segments that separate the process steps of the EEC 12 and the EM 14. To begin, in step S1, EEC 12 reads engine parameters, N2, N3, P30 from an aircraft engine 200 that are typically speed of the intermediate and high speed spools and combustor pressure. EEC executes a bleed control algorithm for scheduling the activation of the bleed engine bleed valves 109. In step S2, EEC 12 forwards on/off bleed control valve commands to buffer 16 within EM 14. In step S3, EEC 12 reads relevant inputs from the engine 200 with regard to the control of the accessories and associated fuel/air control valves. Accordingly, in step S3, the system executes an accessory control algorithm, which generates a schedule for the actuation of the accessories. In step S4, commands indicative of this schedule are sent to the control command buffer 16 wherefrom EMP 20 retrieves the commands. In step S5, EMP 20 checks buffer 16 for the commands. EMP 20 retrieves commands from buffer 16 essentially in the order in which they enter the buffer unless an established hierarchy exists among the commands. In step S6, substantially simultaneously to step S5, EMP 20 reads local parameter P30 to determine if the pressure represented by parameter P30 indicates high engine power. In the event that the system detects high engine power, EM 14 prevents the erroneous opening of more than one engine bleed. This step of prevention thereby becomes a high priority command for execution by EM 14.

In step S7, EMP 20 selects the highest priority command from buffer 16 keeping in consideration the results of the check in step S6. The control process categorizes commands from EEC 12 as priority 1, slew and fire, priority 2, singular open/close of engine bleeds, and priority 3, actuation of an accessory. In step S7, therefore, EMP 20 selects the highest priority command from buffer 16. If no command is present in buffer 16, step S8 is executed and EMP 20 commands the selector valve to the rest position, a priority 4 activity. If the highest priority command is the actuation of accessories, step S9 is executed and EM 14 executes the accessory on/off routine. Accordingly, if the commands in buffer 16 all relate to accessories, EM 14 executes the commands in the order they enter the buffer. If the highest priority command is singular bleed opening and closing via engine bleed valves 109 then step S10 is executed and EM 14 executes the single bleed on/off routine. Similarly, if all commands relate to the singular execution of engine bleed control valves, EM 14 executes commands in the order they enter the buffer. If the highest priority command in the buffer is slew and fire of multiple bleeds due to engine surge detection, then step S11 is executed and EM 14 executes the slew and fire multiple bleed on routine. Each routine is discussed in further detail below with reference to FIGS. 3A and 3B, a more specifically detailed flowchart.

Figure 3A:
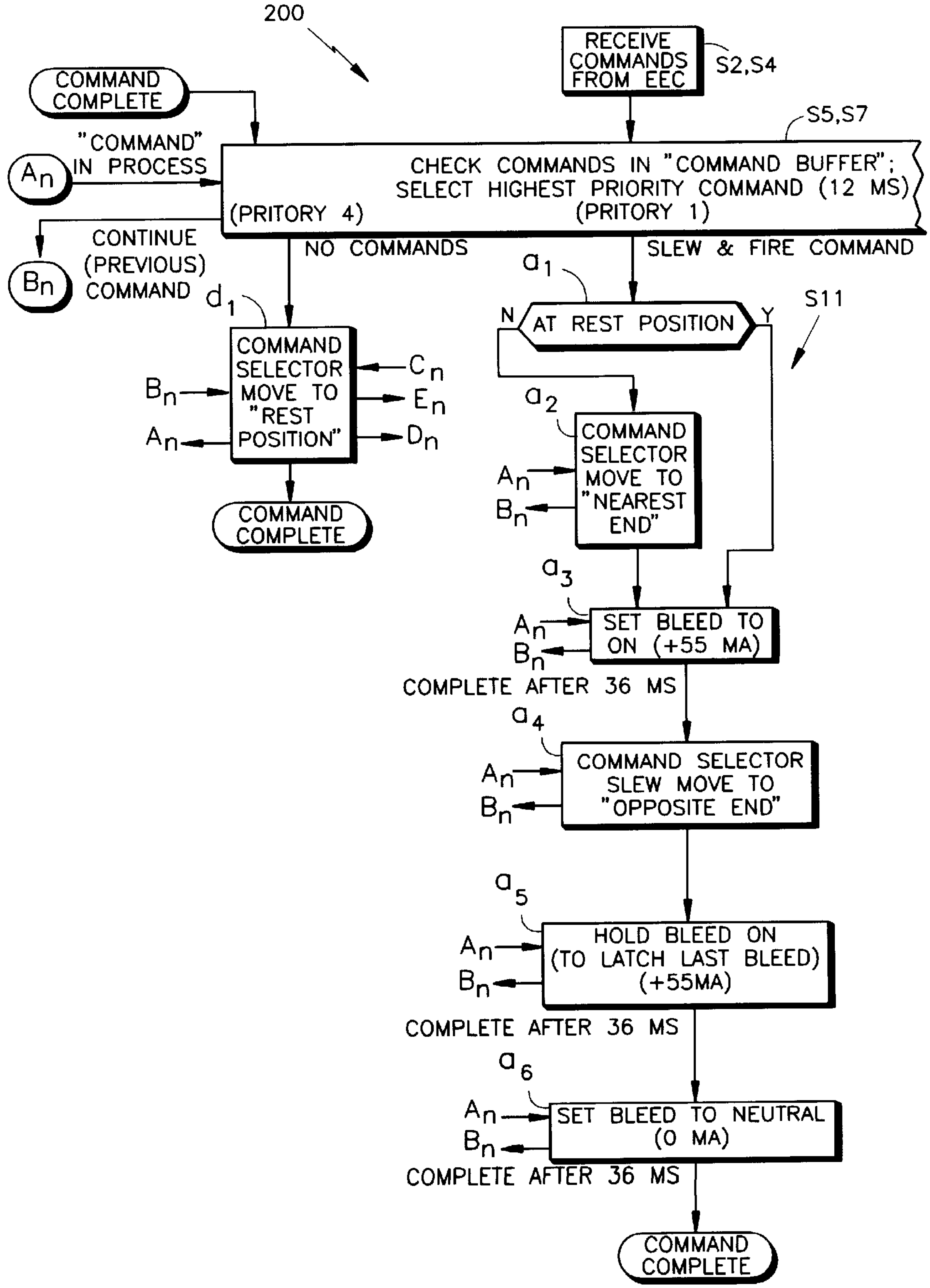
FIGS. 3A and 3B are more detailed flowchart of the controller and method of control provided in FIG. 2.
Figure 3B:
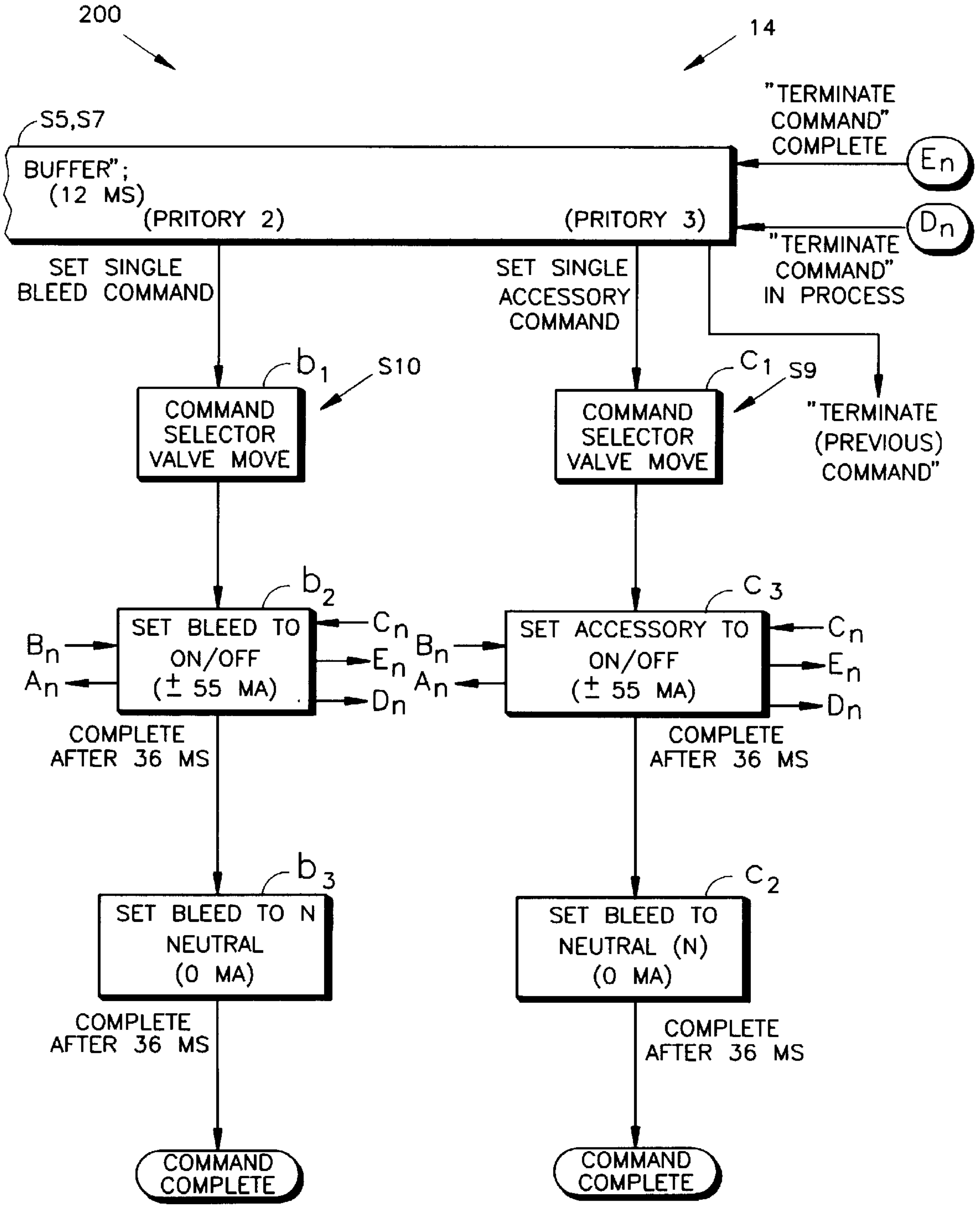

By way of example, FIGS. 3A and 3B indicates the times for executing commands and/or subcommands thereof in milliseconds. The specific application of the controller and the environment of its use may require different execution times. During subcommand execution in priority 1, 2, 3 and 4 commands, the control process includes the exchange of signals between EM 14 and torque motors 104, 110 and 116, LVDTs 106, 112 and switches 118. EM 14 also generates and monitors various signals to control the process 200 such as a command in process and checking for higher priority commands, as indicated by $A_n$. Also, EM 14 generates control signals to continue the command if no higher priority command exists, as indicated by $B_n$. If a command needs termination for the execution of a higher priority command, EM 14 generates signal $C_n$ for terminating the previous command. This is applicable to the priority 2, 3 and 4 commands. The priority 1 command does not terminate until command completion. After generation of termination command $C_n$, EM 14 generates a signal $D_n$ to indicating that command termination is in process. When the termination of the command is complete, EM 14 generates a signal $E_n$ indicating termination is complete.

As indicated in FIG. 2, during the execution of the accessory on/off routine in step S9, basic tasks proceed unless this priority 3 command is interrupted for a priority 1 or 2 command. As indicated in step S10, during the singular engine bleed on/off routine, the control process executes unless interrupted by a priority 1, slew and fire command.

Referring again to FIGS. 3A and 3B, and with specific regard to step S8, a priority 4 command exists when no commands are present in the command buffer 16. As indicated in substep $d_1$, EM 14 commands the selector valve to move to the rest position when the buffer contains no commands.

In step S9, for the execution of the accessory on/off routine, priority 3, the control process runs a single accessory on/off command with the selector valve 102 and the accessory control valve 114. In substep $c_1$, torque motor 104 is energized causing hydraulic valve 105 to position selector valve 102 to the select the desired accessory valves 115. EM 14 then sets the torque motor 116 to +/−55 milliamps, to turn on/off the accessory control valve 114 which then positions the selected accessory valve 115. This is preferably complete in 36 milliseconds. After actuating the accessory, the control process resets the torque motor 116 to a neutral, 0 milliamps setting, to prevent inadvertent or non selected accessory actuation. Substep $c_3$ completes after 36 milliseconds and a command complete signal is generated by EM 14.

In step S10, the control process executes the single bleed on/off routine via selector valve 102 and bleed control valve 108 using the following substeps. In substep $b_1$, selector 102 moves to the appropriate position for selecting the bleed valve for the desired engine bleed via actuation of torque motor 104 and hydraulic valve 105. Accordingly, in substep $b_2$, EM 14 sets torque motor 110 to +/−55 milliamps for opening/closing bleed control valve 108 which in turn actuates the selected engine bleed valves 109. Substep $b_2$ is complete after 36 milliseconds. In substep $b_3$ the torque motor 110 is set to neutral, 0 milliamps, to complete the bleed opening or closing. Substep $b_3$ takes approximately 36 milliseconds to complete. Upon completion, a command complete signal is generated by EM 14 verifying the same.

In step S11, the control process executes the slew and fire, multiple-bleed actuation routine upon the occurrence of engine surge with the selector valve 102 and bleed control valve 108. In substep $a_1$, step S11 determines if selector valve is in the rest position. If the selector valve is not in the rest position, in substep $a_2$, the control process commands selector valve to move to the nearest end. If selector valve 102 is in the rest position, the slew and fire routine continues in substep $a_3$. In substep $a_3$, the control process positions the selector valve 102 to select the first bleed valve and sets torque motor 110 at +55 milliamps for opening the bleed control valve 108, actuating engine bleed valves 109. Substep $a_3$ takes approximately 36 milliseconds to complete. In substep $a_4$, selector 102 moves toward the opposite end via torque motor 104 in conjunction with hydraulic valve 105. In substep $a_5$, multiple bleeds are opened by holding torque motor 110 at +55 milliamps as the selector valve 102 slews across the bleed valves 109. This substep takes approximately 200 milliseconds to complete until latching of the last bleed. In substep $a_6$ the torque motor resets to a neutral 0 milliamps. Substep $a_6$ takes approximately 36 seconds to complete. Upon completion, the control process sends a command complete signal is generated by EM 14, verifying the same.

Referring again to FIG. 2, and as shown by the flowchart for each of steps $S_9$ and $S_{11}$, during execution of the basic tasks, the control process continually repeats step $S_5$. It checks the buffer for higher priority commands that supersede the command currently in process. For the execution of the slew and fire, multiple-bleed-on routine in step $S_{11}$, the control process performs step $S_{14}$ to indicate process status only. This priority 1 command is not interruptable by other commands. However, for steps $S_9$ and $S_{10}$, if the control process detects a higher priority command in the buffer during execution of the substeps, as set forth in FIGS. 3A and 3B, the current in-process command discontinues and the higher priority command supersedes. Buffer checking for steps $S_9$ and $S_{10}$ is given by steps $S_{12}$ and $S_{13}$, respectively, as shown in FIG. 2.

The execution of the commands and accordingly, the actuation of the engine bleed valves 109 in both steps $S_{10}$ and $S_{11}$, are constantly monitored by LVDT's 106 and 112. LVDT's 106 and 112, in step $S_{15}$, forward signals to EEC 12 indicating the status of the commands. Similarly, on a lower priority level, accessory status switches 118 feed back information as to the execution of the accessory related commands. As indicated in FIG. 1, the LVDT's forward positional information to the input interface 18 which EEC 12 monitors. In step $S_{16}$, the EEC 12 examines the LVDT position feedback. However, if during review of the LVDT feedback in step 16, the commands are determined improperly executed, EEC 12 executes a fault accommodation routine in step $S_{18}$. Accordingly, EM 14 is either depowered or subject to +28V disablement.

In operation, EEC 12 reads parameters from engine 200. Based on these parameters, in steps S1 and S3, EEC 12 executes a bleed control and accessory control algorithm for scheduling the actuation of bleed and accessory on/off controls. In steps S2 and S4, EEC 12 sends these commands to buffer 16. In step S5, EMP 20 checks the buffer commands and retrieves the same in the order of placement unless a command hierarchy exists. If a hierarchy exists, EMP 20 selects the highest priority command from buffer 16 and carries the same out. If no commands are present in the buffer, the control process commands the selector 102 to the rest position via torque motor 104 and hydraulic valve 105. EM 14 will execute the accessory on/off routine of step S9 if a priority 1 or 2 command is not in the buffer. During execution of this routine, EMP 20 constantly checks the buffer and interrupts the routine upon detecting a higher priority command. Before executing the accessory on/off routine, EM 14 will execute a single bleed on/off routine of step $S_{10}$ or slew and fire routine of step $S_{11}$. During the execution of the single bleed on/off routine, in step S10, EMP 20 constantly checks buffer 16 for a higher priority command. If EMP 20 detects a priority 1, slew and fire command, EM 14 interrupts steps S10 and executes step S11. In step S11 the process executes the slew and fire, multiple-bleed-on routine, whereby multiple bleeds open in response to an engine surge detection. For each of the accessories, single bleed and multiple bleed routines, the status of the execution of the commands is forwarded to EEC 12 for examination. If step S16 determines proper command execution, EEC 12 continues in S17 to read engine parameters and feed EM 14 in accordance with steps S1–S4. However, if a fault is detected regarding the execution of the commands by EM 14, EEC 12 executes a fault accommodation routine. In step $S_{18}$, EEC 12 depowers EM 14 or takes other safety precautions. The more particular details of the process steps $S_9$, $S_{10}$, and $S_{11}$, are set forth in the forgoing description.

The routines and associated process steps set forth herein are preferably based in a software algorithm, but may also be accomplished by purely electronic means.

The primary advantage of this invention is that an improved controller and method of controlling a hydraulic jet engine control system are provided.

Another advantage of this invention is that an improved controller and method for controlling hydraulic jet engine control system are provided, which use a multiplexing hydraulic control network and latching valves. Still another advantage of this invention is that an improved controller and method of controlling are provided which include means for prioritizing commands provided from an electronic engine control system so that the highest priority commands are executed prior to the execution of lower priority commands. Still another advantage of this invention is that an improved controller and method of controlling are provided for use with a hydraulic control engine control system of a jet engine, which include the ability to supersede lower priority commands being executed with higher priority commands. And yet another advantage of this invention is that an improved controller and method of controlling are provided for use with a hydraulic control system of a jet engine which includes a distributed architecture control system including an electronic engine control and an electronic module, wherein the engine control and module are linked via a bi-directional information feedback loop for the dual monitoring of the engine control and module by each other. And still another advantage of this invention is that an improved controller and method of controlling a hydraulic control system of a jet engine are provided, which include a feedback monitoring system for providing high fault coverage to prevent the occurrence of a hazardous operating condition.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A controller for managing a hydraulic control system of a vehicle, comprising:

means for scheduling the invocation of a plurality of vehicle functions through system operations, wherein the functions are used for operating the vehicle;

means for prioritizing the invocation of said vehicle functions and associated operations by said system;

means for invoking the system to perform said operations based on prioritization by said means for prioritizing; and means for superseding the performance of one of said operations with the performance of a higher priority one of said operations if said higher priority operation arises for performance during performance of said one operation.

2. The controller according to claim 1, wherein the vehicle is an aircraft and said plurality of vehicle functions include at least one of aircraft engine acceleration and deceleration, engine surge avoidance, and aircraft accessory operation.

3. The controller according to claim 2, wherein said means for scheduling comprises an aircraft electronic engine control and said means for prioritizing, invoking and superseding comprise an electronic module.

4. The controller according to claim 3, wherein said electronic engine control includes means for sensing engine parameters for use in scheduling said plurality of vehicle functions and associated operations.

5. The controller according to claim 3, wherein the system includes means for selecting among the plurality of operations to be invoked by said means for invoking, wherein said electronic module includes means for receiving operation commands from said electronic engine control for controlling the means for selecting.

6. The controller according to claim 5, further including means for monitoring said electronic module and said system for determining if said operations have been properly executed, wherein if said operations have not been properly executed, said electronic engine control is operable to invoke safety procedures.

7. The controller according to claim 6, wherein said means for monitoring comprises an information feedback loop between said electronic module and said electronic engine control, said feedback loop indicative of whether said system has been properly invoked by said electronic module.

8. The controller according to claim 7, wherein said electronic module includes means for receiving feedback from said system on the status of said operations, wherein said status is accessible by said electronic engine control for use in monitoring said electronic module.

9. The controller according to claim 6, wherein said means for monitoring is further for monitoring said electronic engine control system.

10. The controller according to claim 9, wherein said means for monitoring comprises a bi-directional information feedback loop between said electronic module and said electronic engine control, said feedback loop indicative to said electronic engine control system of performance of said electronic module and said electronic feedback loop indicative to said electronic module of said performance of said electronic engine control.

11. The controller according to claim 10, wherein said operations and associated vehicle functions are invoked by said system by actuating a plurality of control valves, and performance is measured by proper actuation of the control valves, wherein said safety procedures comprise a fault accommodation logic invokable by said electronic engine control system.

12. The controller according to claim 3, wherein said means for prioritizing includes means for creating a vehicle function and associated operation hierarchy to be monitored and followed by said means for invoking and said means for superseding.

13. The controller according to claim 12, wherein the vehicle is an aircraft and the system is a hydraulic control network operable to invoke said vehicle functions via the actuation of control valves, further including means for storing scheduling commands for access and retrieval by said electronic module, wherein said commands are retrievable from said means for storing in accordance with said hierarchy, said hierarchy including highest priority, medium priority and lowest priority operations, wherein said highest priority operation is the substantially simultaneous opening of multiple engine bleeds during engine surge, said medium priority operation is the opening of individual engine bleeds during normal engine operation, and said lowest priority operation is the actuation of engine accessories.

14. The controller according to claim 3, further including means for monitoring said electronic module for determining if said operations have been properly executed and means for activating safety procedures, wherein if said operations have not been properly, said electronic engine control via said means for activating is operable to invoke said safety procedures.

15. A control method for managing a hydraulic control system of a vehicle, comprising the steps of:

scheduling the invocation of a plurality of vehicle functions through operations, wherein the functions are used for operating the vehicle;

prioritizing the invocation of said vehicle functions and associated operations by said system;

performing said operations based on prioritization created in the step of prioritizing; and superseding the performance of one of said operations with the performance of a higher priority one of said operations if said higher priority operation arises for performance during the performance of said one of said operations.

16. The method according to claim 15, wherein the vehicle is an aircraft and said plurality of vehicle functions include at least one of engine acceleration and deceleration, surge avoidance, and accessory actuation.

17. The method according to claim 15, further including the step of sensing engine parameters for use in said step of scheduling.

18. The method according to claim 15, further including the step of monitoring the performance of said operations for determining proper execution of said vehicle functions and the step of activating safety procedures if said operations have not been properly performed.

19. The method according to claim 18, wherein said step of activating includes invoking a fault accommodation routine.

20. The method according to claim 15, wherein said step of prioritizing includes creating a vehicle function and associated operation hierarchy for use in the steps of performing and superseding.

21. The method according to claim 20, further including the steps of storing scheduling and hierarchy commands and retrieving said commands for use by said system during said step of performing in accordance with said hierarchy.

22. The method according to claim 21, wherein the vehicle is an aircraft and the system is operable to invoke said operations associated with the actuation of said vehicle functions via control valves, said step of prioritizing including the step of setting highest priority, medium priority and lowest priority system operations, wherein said highest priority operation includes substantially simultaneously opening multiple engine bleeds during engine surge, said medium priority operation includes opening individual engine bleeds during normal engine operation, and said lowest priority operation includes actuating engine accessories.

23. The method according to claim 22, wherein the step of performing includes at least one of invoking said highest priority operation, invoking said medium priority operation and invoking said lowest priority operation.

24. The method according to claim 23, wherein said system includes a hydraulically actuated selector valve and means for actuating said selector valve, a plurality of engine bleed control valves actuable by said selector valve, and a plurality of accessory control valve actuable by said selector valve, said step of invoking the highest priority operation including the step of commanding said selector valve to rapidly actuate said plurality of engine bleed control valves in response to an engine surge detection.

25. The method according to claim 24, wherein the step of invoking the medium priority operation includes the step of commanding said selector valve to individually actuate singular engine bleed control valves in the course of normal engine operation.

26. The method according to claim 24, wherein the step of invoking the lowest priority operation includes the step of commanding said selector valve to individually actuate accessory control valves in the course of normal vehicle operation.

27. The method according to claim 22, wherein said step of prioritizing include continually checking said scheduling and hierarchy commands during the performance of said operations.

28. The method according to claim 22, wherein said step of superseding includes stopping performance of a lowest priority operation if one of a medium and higher priority operation is detected during said step of checking and stopping the performance of a medium priority operation if a highest priority operation is detected during said step of checking.

* * * * *